IMPULSE CORRELATON FUNCTION GENERATOR

Filed Dec. 27, 1965 6 Sheets-Sheet 1

INVENTOR.
FRANK S. GUTLEBER
BY Alfred C. Hill
AGENT

IMPULSE CORRELATON FUNCTION GENERATOR

Filed Dec. 27, 1965 6 Sheets-Sheet 2

INVENTOR.
FRANK S. GUTLEBER

BY Alfred C Hill

AGENT

INVENTOR.
FRANK S. GUTLEBER
BY
Alfred C. Hill
AGENT

IMPULSE CORRELATON FUNCTION GENERATOR

Filed Dec. 27, 1965 6 Sheets-Sheet 4

INVENTOR.
FRANK S. GUTLEBER
BY
Alfred C Hill
AGENT

IMPULSE CORRELATON FUNCTION GENERATOR

Filed Dec. 27, 1965 6 Sheets-Sheet 5

INVENTOR.
FRANK S. GUTLEBER

BY Alfred C. Hill

AGENT

IMPULSE CORRELATON FUNCTION GENERATOR
Filed Dec. 27, 1965 6 Sheets-Sheet 6
Fig. 16, Fig. 17
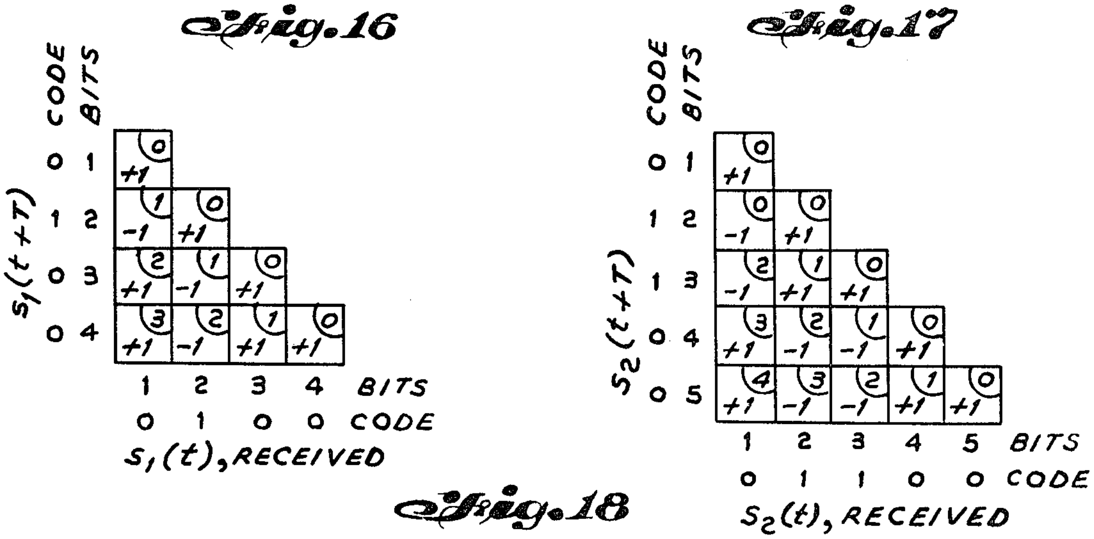
Fig. 18
| T | -4 | -3 | -2 | -1 | 0 | +1 | +2 | +3 | +4 |
|---|---|---|---|---|---|---|---|---|---|
| $\sum s_1(t) \times s_1(t+T)$ | | +1 | 0 | -1 | +4 | -1 | 0 | +1 | |
| $\sum s_2(t) \times s_2(t+T)$ | +1 | 0 | -3 | 0 | +5 | 0 | -3 | 0 | +1 |
| $e_0$ | 0 | 0 | 0 | 0 | +20 | 0 | 0 | 0 | 0 |
Fig. 19
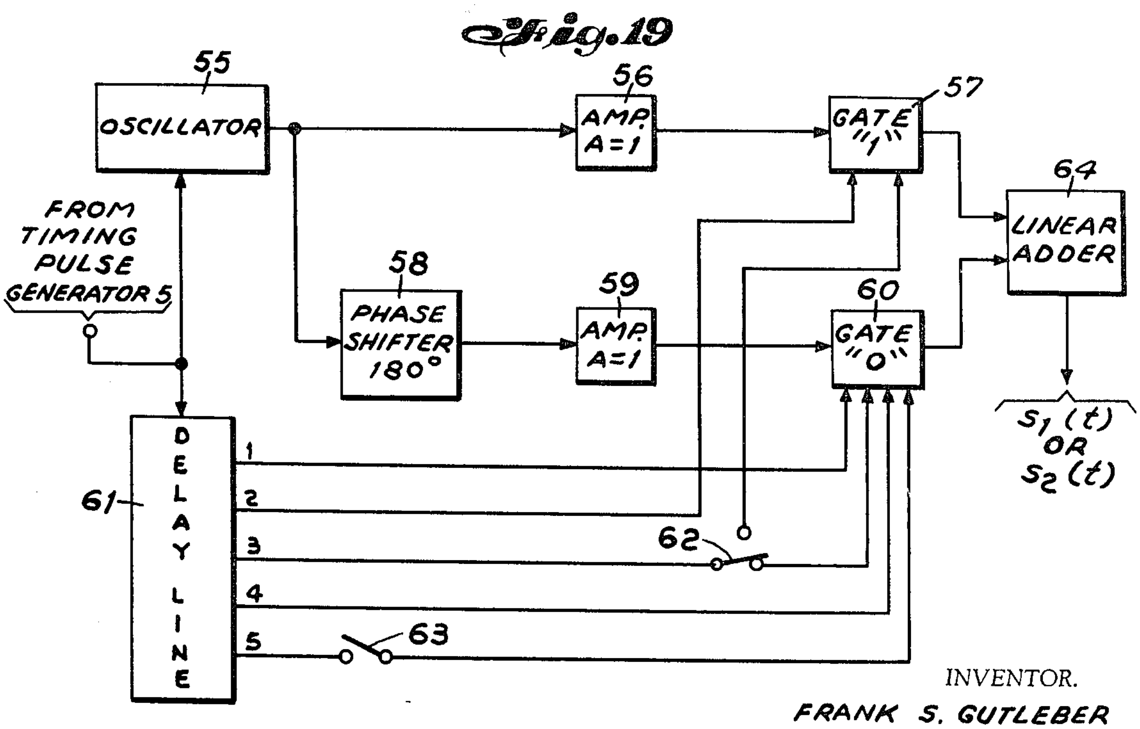
INVENTOR.
FRANK S. GUTLEBER
BY Alfred C. Hill
AGENT United States Patent Office
3,518,415
Patented June 30, 1970

3,518,415
IMPULSE CORRELATION FUNCTION GENERATOR

Frank S. Gutleber, Wayne, N.J., assignor to International Telephone and Telegraph Corporation, Nutley, N.J., a corporation of Delaware Filed Dec. 27, 1965, Ser. No. 516,419
Int. Cl. G06g *7/19;* G06j *1/00;* H04b *1/10*
U.S. Cl. 235—181 10 Claims

ABSTRACT OF THE DISCLOSURE

Two sequences of code pulses are generated and either time or frequency multiplexed. Replicas of these sequences of code pulses are also provided and will be either time or frequency multiplexed compatible with the multiplexing of the original sequences. Each sequence and its replica are correlated. The code patterns of the sequences and their replicas are selected so that upon correlation at least one sequence and its replica produces a zero output for each selected time delay interval except when the sequences and their replicas are time coincident when both sequences and their replicas produce a finite output. The resultant correlated outputs are further correlated resulting in a zero output for each selected time delay interval except when the sequences and their replicas are time coincident when an impulse output is produced.

This invention relates to pulse signalling systems and more particularly to an improved correlation technique for the use in pulse signalling systems.

Correlation techniques have been utilized in the past in signalling processing systems employing signals in the form of a pulse or sequence of pulses. Such pulse signalling systems include, for example, radiant energy reflecting systems, such as radar, radio range finders, radio altimeters and the like; and pulse communication systems, such as over-the-horizon systems employing various types of scatter techniques, satellite communication systems and the like. Correlation techniques when employed in radiant energy reflecting systems enhance the resolution of closely spaced reflecting surfaces and, in addition, particularly when wide pulse signal widths are employed, increase the average power transmitted. Correlation techniques when employed in pulse communication systems result in increased signal-to-noise ratios without increase of transmitter power and minimized multiple path effects (fading).

According to prior art correlation techniques the received signal is processed by obtaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high amplitude peak. The presence of these spurious peaks is undesirable in that the resolving power of radiant energy reflecting systems is reduced and the signal-to-noise ratio and minimization of multiple path effects of pulse communication systems is reduced to a level below the optimum value.

Therefore, an object of this invention to provide optimized pulse signalling systems utilizing correlation techniques which result in an impulse correlation function.

The term "impulse correlation function" as employed herein refers to a waveform having a single high amplitude peak completely free from spurious peaks of lower amplitude elsewhere in the waveform.

Previously two correlation techniques have been proposed that will result in an impulse correlation function. One of these techniques requires the generation of a first sequence of coded pulses, a replica of this first sequence of coded pulses, and a second sequence of coded pulses. These two sequences of coded pulses are each separately correlated with the replica of the first sequence of coded pulses to produce from each correlation separate correlated outputs which in turn are correlated to produce the impulse correlation function. The two sequences of coded pulses each have a distinctive code pattern so that when one of the correlated outputs is a finite value the other correlated output is zero resulting in a zero output when these correlated outputs are correlated one with the other except when the first and second sequences of coded pulses are in time coincidence with the replica of the first sequence of coded pulses. The second correlation technique to obtain an impulse correlation function requires the production of a sequence of coded pulses having a predetermined pattern so that when this sequence of coded pulses and its replica are correlated a zero output will result at all times except when the sequence of coded pulses and its replica are in exact time coincidence.

The disadvantage of the first impulse correlation function technique above described is that of requiring the production of a second sequence of coded pulses to assure that when the first sequence of coded pulses and its replica are correlated and produce a finite output that the correlation between the second sequence of coded pulses and the replica of the first sequence of pulses is zero so as to produce a zero output in a third correlation process.

In the second impulse correlation function technique above described, the performance is optimum until it is desirable to employ an extremely long sequence of coded pulses to increase the average power transmitted. Then it becomes very tedious and requires a complex coding arrangement to generate the code that will provide the desired impulse correlation function and increased average transmitted power.

Therefore, another object of this invention is to provide pulse signalling systems incorporating impulse correlation function techniques which will maintain the coding circuitry relatively simple and will eliminate the necessity of generating a second sequence of coded pulses solely for the purpose of forcing a zero output if the correlation between the first sequence of coded pulses and its replica does not result in a zero.

Still another object of this invention is to provide at least two multiplexed sequences of coded pulses to reduce the complexity of code generation and yet maintain the advantage of having a long sequence of coded pulses.

A feature of this invention is the provision of an impulse correlation function generator comprising means to produce at least first and second sequences of coded pulses each having a different characteristic and a replica of each of said first and second sequences of coded pulses and correlation means responsive to the first and second sequences of coded pulses and the replicas of said first and second sequences of coded pulses to produce an impulse output only at the time of coincidence of the first and second sequences of the coded pulses with the replicas of the first and second sequences of coded pulses and a zero output at all other times.

Another feature of this invention is the provision of generating the first and second sequences of coded pulses in time sequence and thereby dispose the replicas of the first and second sequence of coded pulses in the same time sequence.

Still another feature of this invention is the provision of means to separate the first and second sequences of coded pulses which are generated in time coincidence on a frequency basis and, hence, separate the time coincident replicas of the first and second sequences of coded pulses on the same frequency basis.

The above-mentioned and other objects and features of this invention will become more apparent by reference to the following description taken in conjunction with the accompanying drawings, in which:

FIGS. 16 and 17 are bar graphs of additional first and second sequences of coded pulses which may be employed in the systems of FIGS. 1 and 3;

Figure 1:
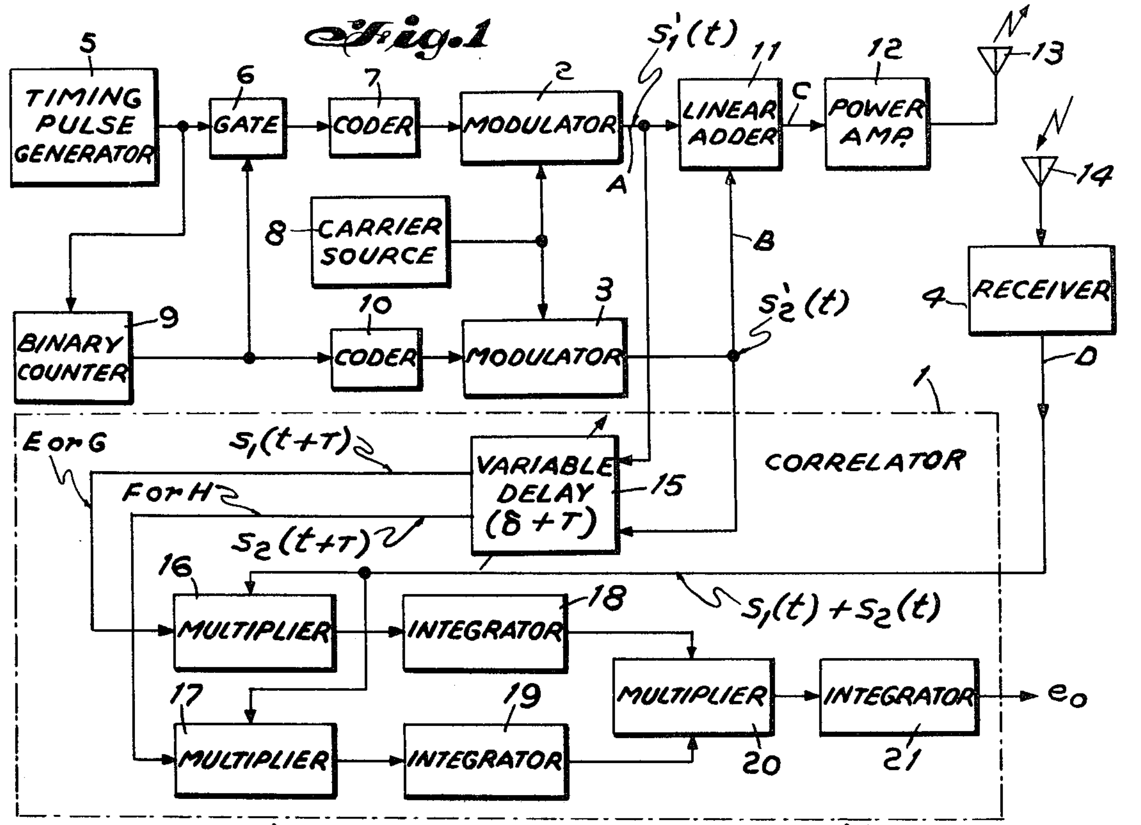
FIG. 1 is a block diagram of a signalling system incorporating an impulse correlation function generator in accordance with the principles of this invention where the first and second sequences of coded pulses and their respective replicas are separated on a time basis.
Figure 3:
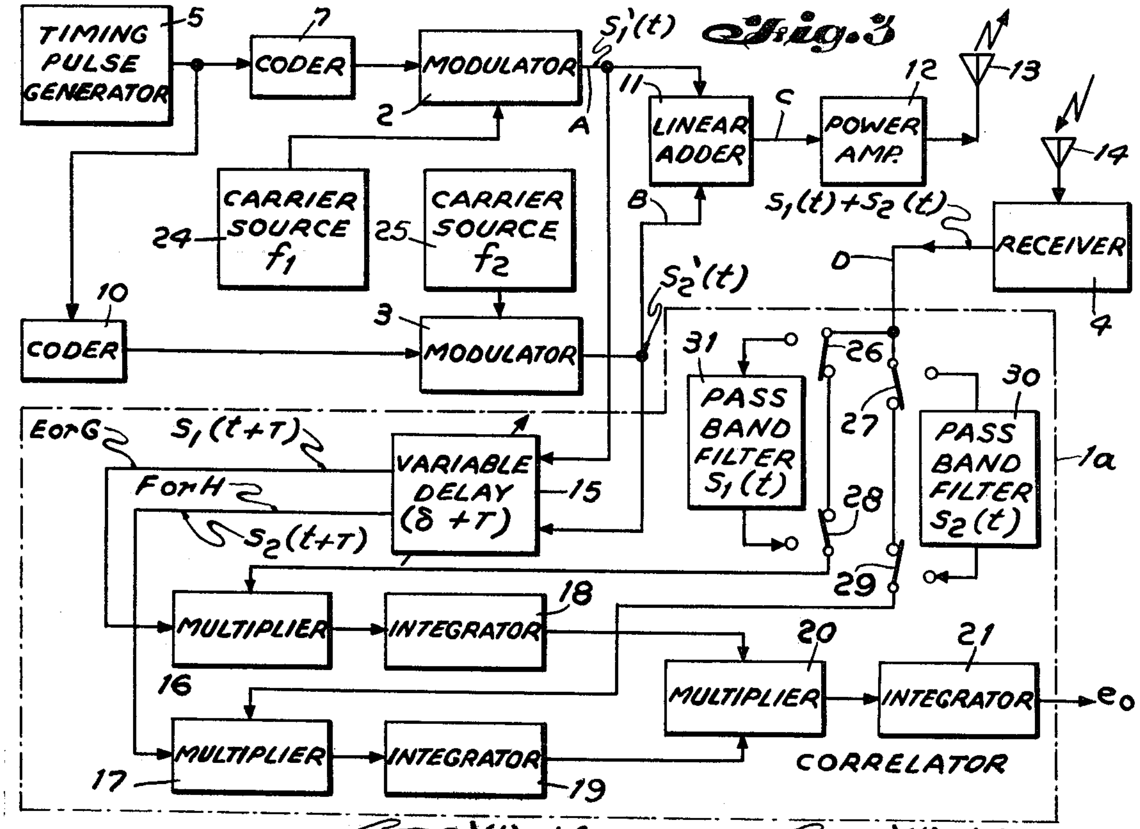
FIG. 3 is a block diagram of a pulse signalling system incorporating an impulse correlation function generator in accordance with the principles of this invention where the first and second sequence of coded pulses and their respective replicas are separated on a frequency basis.

FIG. 18 is a table illustrating the summation of the correlation products of the codes of FIGS. 16 and 17 to produce the desired impulse correlation function output of the systems of FIGS. 1 and 3; and FIG. 19 is a block diagram of a coder that may be utilized to generate the codes of FIGS. 16 and 17 for use in the systems of FIGS. 1 and 3.

The description hereinbelow and the illustrations of the drawings is presented in connection with a radar system. However, it should be understood that the principles expounded hereinbelow can be applied to other systems, for instance, radio direction finders, radio altimeters, and radio communication systems used for over-the-horizon communication, satellite communication and the like employing pulse code modulation techniques and in particular orthogonal pulse code modulation techniques.

In FIG. 1, correlator 1 receives first and second sequences of coded pulses from the outputs of modulators 2 and 3 and replicas of these first and second sequences of coded pulses from the output of receiver 4. The first and second sequences of coded pulses at the outputs of modulators 2 and 3 and their replicas at the output of receiver 4 are separated on a time basis and thus forms a time multiplex system. It is required that the two sequences of code pulses be generated so that they each have a different code pattern with the code pattern of each sequence of coded pulses being related to each other in such a way that when one sequence is correlated with its replica and the other sequence is correlated with its replica at least one resultant correlated output wil have a value of zero in all times positions, or time delay intervals except when $T=0$ (time coincidence between each sequence and its replica) when the correlation of each sequence and its replica produces a finite output. Thus, when these resultant correlated outputs are correlated together the resultant output of correlator 1 is a zero output for all time positions except when the first and second sequences of coded pulses are in time coincidence ($T=0$) with their associated replicas when the correlation of the resultant outputs produces an impulse output.

More specifically, timing pulse generator 5 transmits its timing signal through normally conductive gate 6 to coder 7 to produce the first sequence of coded pulses to modulates the carrier signal produced by carrier source 8 in modulator 2. The timing pulse of generator 5 is also coupled to binary counter 9 to delay the triggering pulse from generator 5 a sufficient amount to achieve the desired time separation between the first and second sequences of coded pulses in the system of FIG. 1. When there is an output from counter 9, gate 6 is rendered nonconductive and coder 10 is triggered into operation to produce the second sequence of coded pulses to modulate the carrier of source 8 in modulator 3. Gate 6 may take the form of an inhibit gate. The output from modulators 2 and 3 are coupled to linear adder 11 to add these two signals linearly for application to power amplifier 12 for radiation from antenna 13. The reflected or echo signals resulting from intercepting a reflecting object is received at antenna 14 and coupled to receiver 4 wherein the time spaced first and second sequences of coded pulses are made available for application to correlator 1.

The first sequence of coded pulses at the output of modulator 2 is coupled through variable delay device 15 to one input of multiplier 16 and the second sequence of coded pulses at the output of modulator 3 is coupled through variable device 15 to one input of multiplier 17. The other input of multiplier 16 is coupled to the output of receiver 4 and the other input of multiplier 17 is coupled to the output of receiver 4. Due to the time relationship between the first and second sequences of coded pulses at the output of modualtors 2 and 3 and the corresponding time relationship between the replica of the first sequence of coded pulses and the replica of the second sequence of coded pulses at the output of receiver 4, multiplier 16 acts to correlate only the first sequence of coded pulses with its replica and multiplier 17 acts to correlate only the second second of pulses and its replica. Thus, multiplier 16 does not perform a correlation between the first sequence of coded pulses and the replica of the second sequence of coded pulses, nor does the multiplier 17 perform a correlation between the second sequence of coded pulses and the replica of the first signal first sequence of coded pulses. The output of multiplier 16 is coupled to integrator 18 which will integrate and store the resultant correlation over a large number of pulses containing the first sequence of coded pulses. Integrator 19 performs the same function with respect to multiplier 17 and the second sequence of coded pulses. This operation of integrators 18 and 19 places the correlated output therefrom on the same time basis.

As hereinabove mentioned the code patterns of the coded sequences are each different one from the other but related to each other so that if at one time position the first coded sequence and its replica provides an output having a finite value from integrator 18, the second coded sequence and its replica provides a zero output from integrator 19. The reverse condition is also true. Thus, when the outputs of integrators 18 and 19 are coupled to multiplier 20 the resultant output of multiplier 20 will be zero and will be integrated in integrator 21. Thus, due to the coded patterns of the coded sequences multiplier 20 will produce a zero output for each selected time position, or time delay interval, since at least one of the coded sequences and its replica produces a zero output from integrators 18 or 19, except when T=zero, where T equals the relative time displacement between the sequences of coded pulses and their replicas. When T equals zero, the first sequence of coded pulses is in time coincidence with its replica and the second sequence of coded pulses is in time coincidence with its replica and the coded patterns of the coded sequences are selected to providing a finite value at the output of both integrators 18 and 19, resulting in a finite or impulse output from multiplier 20 and integrator 21.

Figure 2:
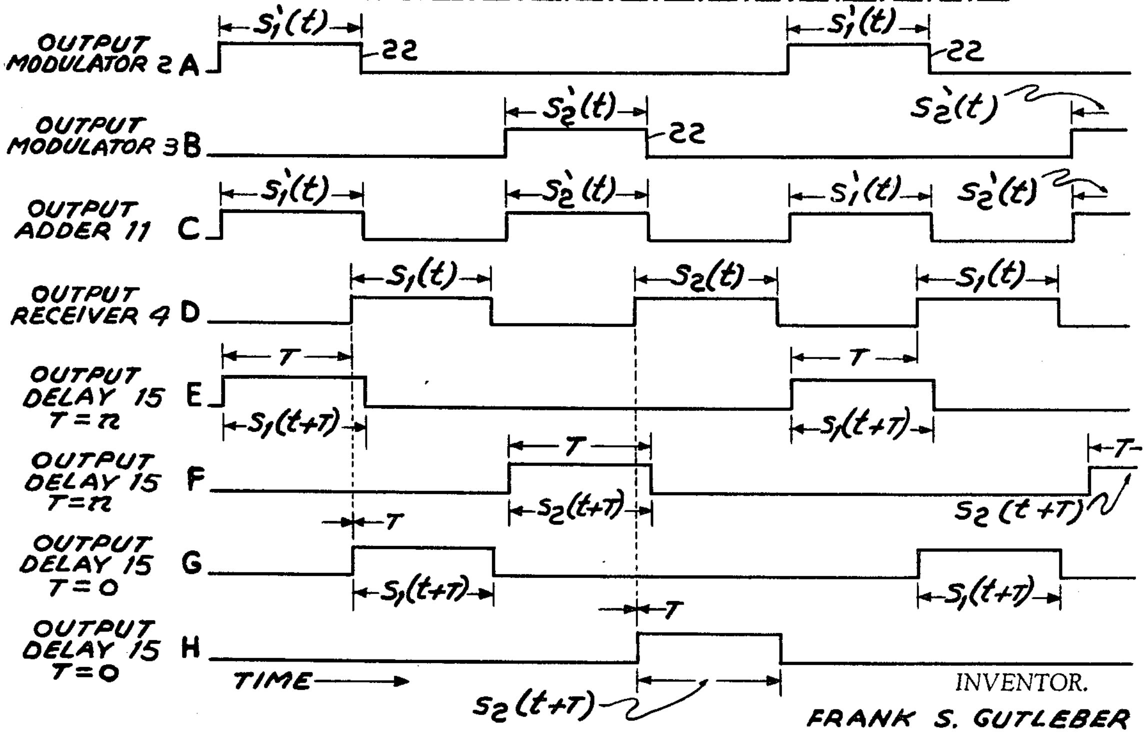
FIG. 2 is a timing diagram useful in explaining the operation of FIG. 1.

FIG. 2 illustrates a timing diagram which is useful in understanding the operation of FIG. 1. Curve A illustrates the output of modulator 2 which is the first sequence of coded pulses. Curve B illustrates the output of modulator 3 which is the second sequence of coded pulses. It should be noted that in both curves A and B the sequence of coded pulses are contained within one wide pulse 22 and may contain therein a number of bits depending upon the length of each of the first and second sequence of coded pulses. Curve C illustrates the resultant multiplexed output of adder 11 wherein the sequences of coded pulses of the output of modulators 2 and 3 are time interleaved. The receiver 4 produces at its output the waveform illustrated in curve D. It will be observed that there is a time difference between the waveforms of curves C and D which is proportional to twice the distance to the target intercepted by the transmitted coded sequences. Curves E and F illustrate the output of delay device 15 at $T=n$, where $n$ equals a finite value of relative time displacement between the sequences of coded pulses and their replicas. Comparing curves D and E, it is seen that the first bit of the replica of the first sequence of coded pulses at the output of receiver 4 is coincident with the last bit of the first sequence of coded pulses at the output of delay device 15. This same relationship is present when comparing curves D and F. For any value of T including that illustrated in curves E and F and up to but not including that illustrated in curves G and H will produce a zero output from correlator 1. However, when the output of delay device 15 is related to curve D as illustrated in curves G and H, that is, when the first sequence of coded pulses and its replica and the second sequence of coded pulses and its replica are in time sequence there will be an output of finite value from integrators 18 and 19 and, thus, an output of finite value from multiplier 20 and an impulse will be present at the output of correlator 1. Therefore, the desired impulse correlation function is generated.

Figure 4:
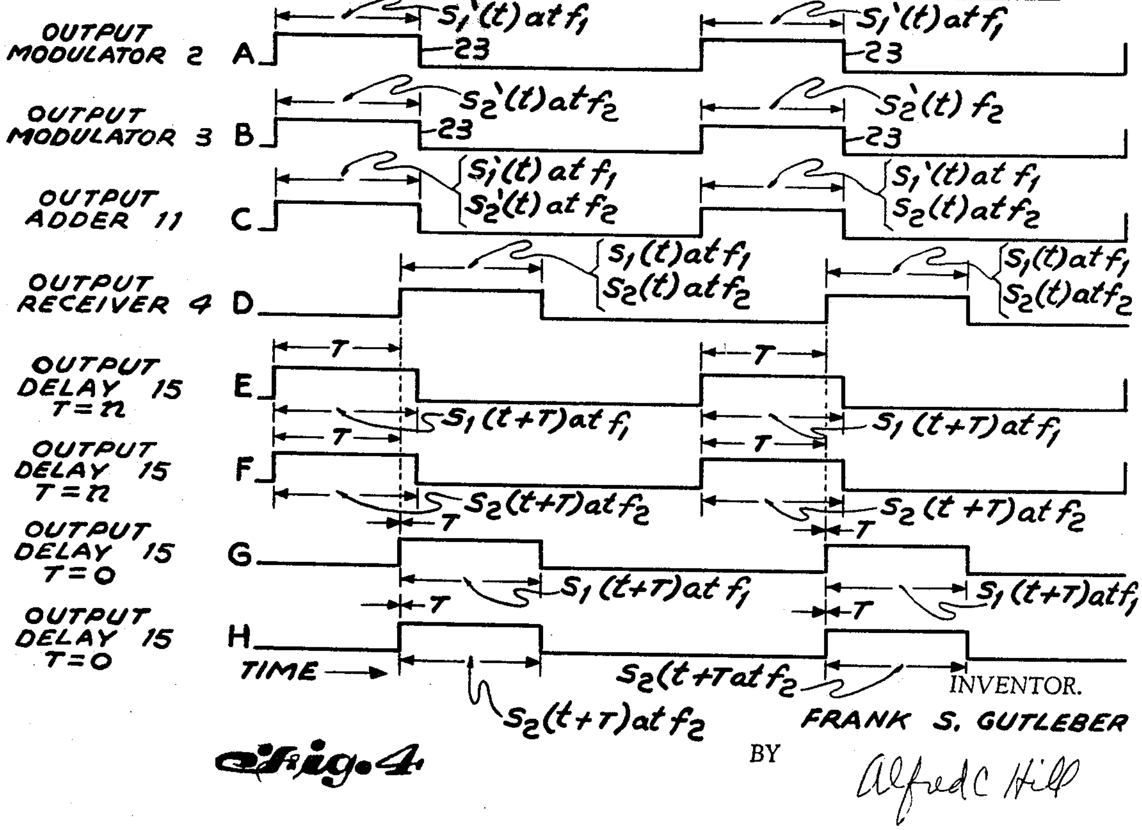
FIG. 4 is a timing diagram useful in explaining the operation of FIG. 3.

FIG. 3 illustrates another multiplex arrangement incorporating the improved correlation techniques in accordance with the principles of the invention. Correlator 1*a* receives from modulator 2 the first sequence of coded pulses as illustrated in curve A. FIG. 4 and from modulator 3 the second sequence of coded pulses as illustrated in curve B, FIG. 4. In addition correlator 1*a* receives the replica of the first and second sequences of coded pulses from the output of receiver 4.

Components common to FIGS. 1 and 3 have been given the same reference characters. The primary difference between the arrangement of FIG. 1 and FIG. 3 is that the coders 7 and 10 are simultaneously triggered by the output of generator 5 and couple their coded pulses to modulators 2 and 3 to produce the sequence of coded pulses contained in pulses 23 of curves A and B, FIG. 4. A source 24 is coupled to modulator 2 to provide a carrier signal having a frequency $f_1$ and a source 25 is coupled to modulator 3 to provide a carrier signal having a frequency $f_2$. Thus, the outputs of modulators 2 and 3 are applied to linear adder 11 simultaneously but separated from each other on a frequency basis resulting in the pulse output as illustrated in curve C, FIG. 4. This frequency multiplexed signal is then applied through amplifier 12 to antenna 13 for transmission to a distant target. The reflection from the distant target is received by antenna 14 and the replicas of the first and second sequence of coded pulses are provided at the output of receiver 4 for coupling to correlation means 1*a*.

The output of receiver 4 is illustrated in curve D, FIG. 4 and is displaced in time from curve C, FIG. 4 due to the distance the transmitted pulse had to travel to the target and back to the receiver.

The output from modulator 2 is coupled through variable delay device 15 to multiplier 16 while the output from modulator 3 is coupled through variable delay device 15 to multiplier 17. The output of receiver 4 is coupled to both multipliers 16 and 17 when switches 26, 27, 28 and 29 are in the position illustrated. The correlation between the first sequence of coded pulses and the replica thereof takes place in multiplier 16 and the correlation between the second sequence of coded pulses and the replica thereof takes place in multiplier 17. The integrators 18 and 19 coupled to the output of multiplier 16 and 17, respectively, produce output signals including zero. In addition integrators 18 and 19 which are in effect low pass filters have their frequency characteristic adjusted to pass only the correlation of the first sequence of coded pulses and the replica thereof at frequency $f_1$ through integrator 18 and to pass the correlation of the second sequence of coded pulses and the replica thereof at frequency $f_2$ through integrator 19. The output of integrators 18 and 19 are coupled to multiplier 20 and, hence, to integrator 21 to produce an output for correlation means 1*a*.

As in the case of the arrangement of FIG. 1, the two sequences of coded pulses each have a different code pattern so that if at T not equal to zero an output other than zero is produced at the output of integrator 18 there is an output from integrator 19 equal to zero so that when these two values are correlated in multiplier 20 there results a zero output from correlator 1. In a like manner, at T not equal to zero, when there is an output from integrator 19 of a given magnitude the output from integrator 18 is zero so that multiplier 20 produces no output for correlator 1. However, at T equals zero, when both integrators 18 and 19 produce a finite output there is an output from multiplier 20 and integrator 21 and, hence, an impulse at the output of correlator 1*a*. Thus, correlator 1*a* provides the desired impulse correlation functions.

Rather than just relying upon the passband of integrators 18 and 19 to separate the two frequency multiplexed sequences of coded pulses, switches 26 through 29 can be moved to their other position and apply the output from receiver 4 through the bandpass filters 30 and 31. In this arrangement, bandpass filter 30 would pass the replica of the second sequence of coded pulses having a center frequency $f_2$ while bandpass filter 31 will pass the replica of the first sequence of coded pulses having a center frequency $f_1$. When this arrangement is employed, the replicas of the first and second sequences of coded pulses are separated from each other prior to application to multipliers 16 and 17 to accomplish the desired correlation between the first and second sequence of pulses and their replicas.

Curves E and F, FIG. 4 illustrate the output of delay device 15 for both the first and second sequence of coded pulses, respectively with the last bit of these sequences of coded pulses being in coincidence with the first bit of the replicas thereof at the output of receiver 4. When curves D and E and curves D and F are correlated in multipliers 16 and 17, respectively, a zero output will result from correlator 1, since of the correlation product of a least one of these multipliers is zero. Curves G and H, FIG. 4 illustrate the output of delay device 15 at a time T equals zero for both the first and second sequence of coded pulses. At this time there will be an output from both integrators 18 and 19, since the first and second sequences of coded pulses and their replicas are in time coincidence resulting in an output from multiplier 20 and integrator 21 and, hence, an impulse at the output of correlator 1.

The systems of FIGS. 1 and 3 will produce the desired impulse correlation function if the following conditions are met:

$$\int S_1(t+T)X[S_1(t)+S_2(t)]=0$$

for all values of T except when $T=0$ and when $$\int S_2(t+T)X[S_1(t)+S_2(t)]=0$$

Figure 5:
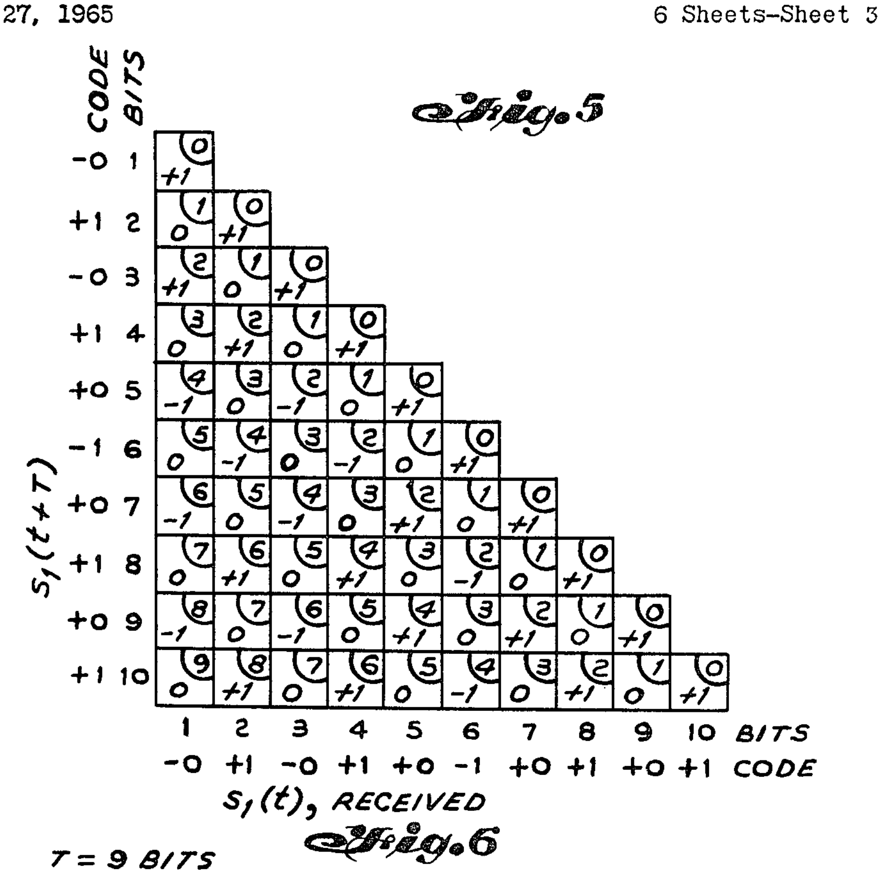
FIG. 5 is a bar graph illustrating the correlation function of a first sequence of coded pulses and its replicas that may be employed in the systems of FIGS. 1 and 3.
Figure 10:
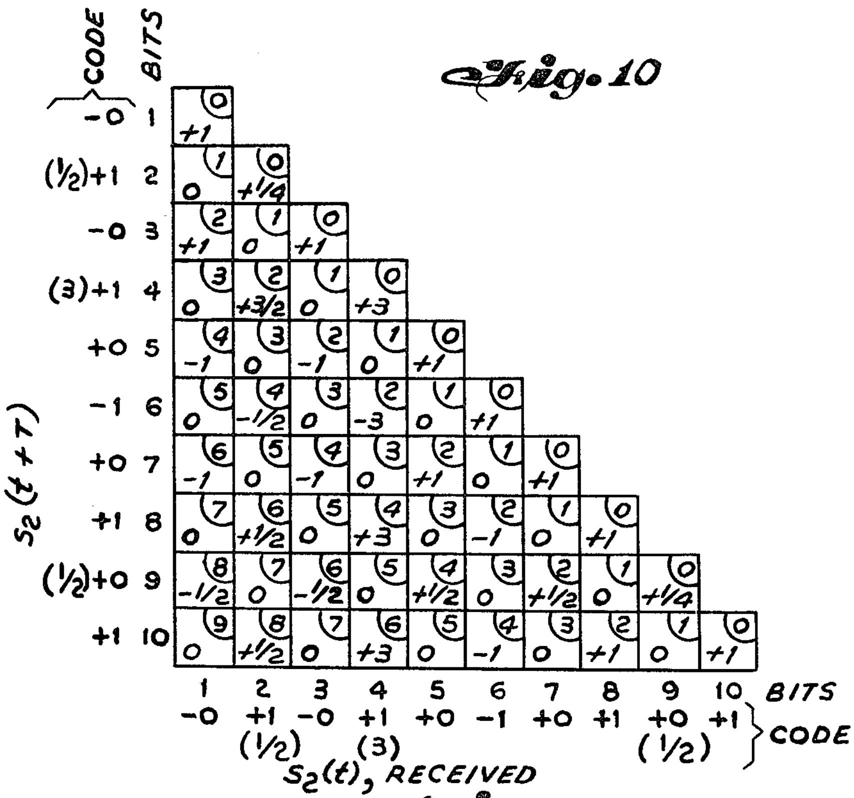
FIG. 10 is a bar graph illustrating the correlation function of a second sequence of coded pulses and its replica that may be utilized in the systems of FIGS. 1 and 3.

FIGS. 5 and 10 illustrate, respectively, two different sequences of coded pulses which enable both the systems of FIGS. 1 and 3 to meet the above conditions and produce the desired impulse correlation function. The code is set forth in both FIGS. 5 and 10 as the coordinate valves of the bar graph of these figures with the code bits thereof being indicated by the values +0, −0, +1 or −1 which correspond to different phases of a reference signal as follows:

$$+0=+90°$$
$$-0=-90°$$
$$+1=0°$$
$$-1=180°$$

The value in ( ) next to the phase indication of a code bit in FIG. 10 represents the magnitude of this particular bit of the code. Where there is no value in ( ) in FIGS. 5 and 10, it is to be understood that the magnitude of the code bit is unity.

The correlation of the first sequence of coded pulses and its replica for different values of T from $T=9$ to $T=0$ is illustrated in FIG. 5 by the diagonal rows containing the same circled number. The correlation of the second sequence of coded pulse and its replica for different values of T from $T=9$ to $T=0$ is illustrated in FIG. 10 by the diagonal rows containing the same circled number. By summing the quantities in each of the diagonal rows for each value of T, it is possible to determine the correlation function of each of the sequence of coded pulses of both FIGS. 5 and 10. Taking a particular value of T and summing the corresponding diagonal rows of each graph of FIGS. 5 and 10, it is possible to determine the resultant output of multipliers 16 and 17, FIGS. 1 and 3 at the selected value of T.

The correlation product indicated in each square of the bar graphs of FIGS. 5 and 10, is obtained in accordance with the following logic equations which determine the sense or zeros only and not the magnitude of the bit:

$$\pm1\times\pm1=+1$$
$$\pm0\times\pm1=0$$
$$\pm0\times\pm0=+1$$
$$\pm1\times\mp0=1$$
$$\pm1\times\mp1=-1$$
$$\mp0\times\pm1=0$$

The magnitude of the bits is the product of the magnitude of the correlated bits times the result of the appropriate one of the above logic equations.

FIGS. 6 through 9 illustrate the relationship between the first sequence of coded pulses and its replica of FIG. 5 for the indicated values of T while FIGS. 11 through 14 illustrate the relationship between the second sequence of coded pulses and its replica of FIG. 10 for the same values of T. Both these groups of figures are going to be used to illustrate how the correlator 1 of FIGS. 1 and 3 cooperate to the end of achieving an impulse correlation function in accordance with the principles of this invention.

Figure 6:
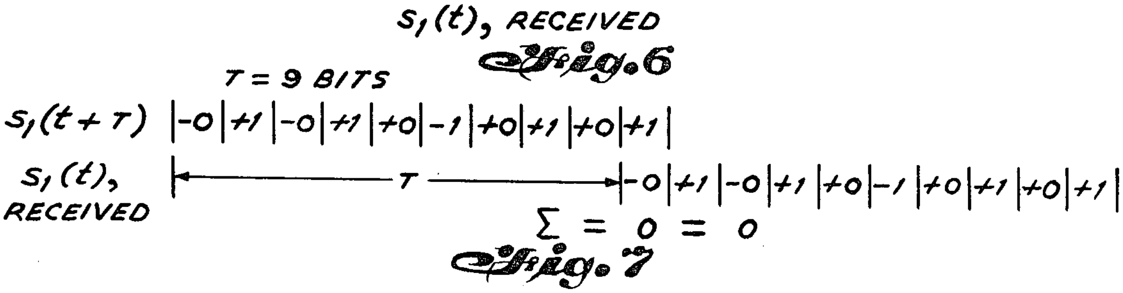
FIGS. 6, 7, 8 and 9 are diagrams illustrating the correlation of the first sequence of coded pulses and its replica illustrated in FIG. 5 for various values of T.
Figure 11:
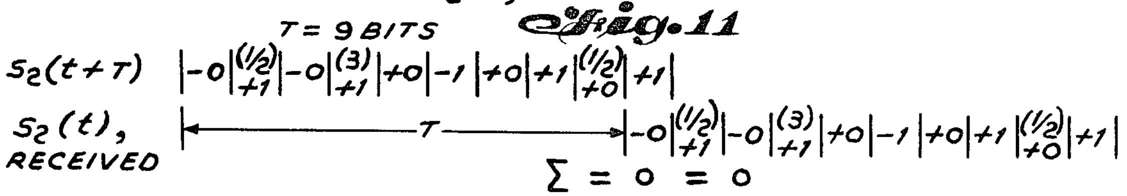
FIGS. 11, 12, 13 and 14 are diagrams illustrating the correlation of the second sequence of coded pulses and its replica illustrated in FIG. 10 for various values of T.

In FIG. 6, T equals 9 bits and the code of FIG. 5 is shown in its relationship with its replica resulting in a sum equal to zero. This would be the output of integrator 18 in both FIGS. 1 and 3. When this value is in multiplier 20, FIGS. 1 and 3, with whatever value is present at the output of integrator 19, the resultant output of multiplier 20 would be zero. However, FIG. 11 illustrates the relationship between the second sequence of coded pulses of FIG. 10 and its replica for T equals 9 bits which results in a sum equal to zero.

Figure 7:
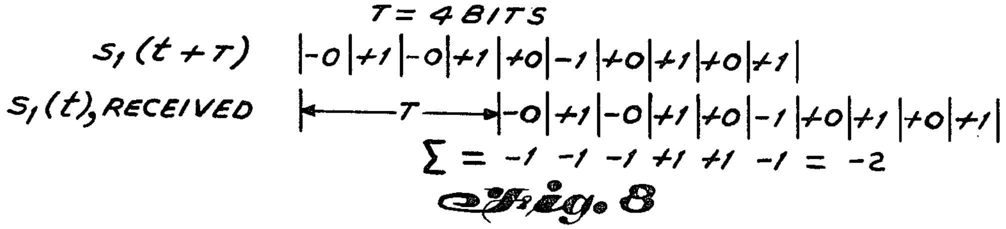
Figure 12:
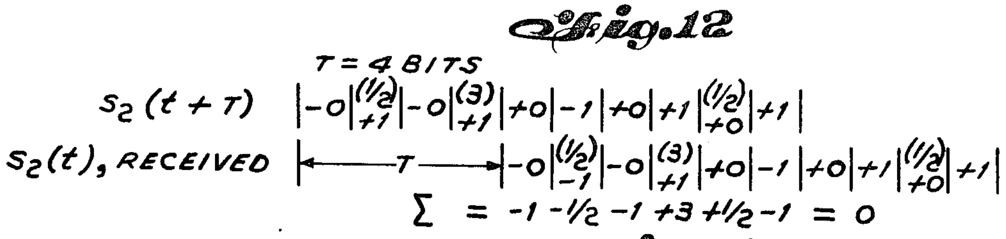

Consider now FIG. 7 where T equals 4 bits. The output of delay device 15, namely $S_1$ $(t+T)$ is shown in relationship with its replica at the output of receiver, namely $S_1$ $(t)$. Taking the products, according to the above logic and algebraically adding it is found that the sum is equal to −2. This finite value would appear at the output of integrator 18, FIGS. 1 and 3. To assume that no output occurs from correlator 1, the second sequence of coded pulses or in other words the code of FIG. 10, has a perdetermined pattern to produce a sum equal to zero for T equal to 4 bits. FIG. 12 illustrates the relationship between $S_2$ $(t+T)$ and $S_2$ $(t)$, Rec., the resultant correlation products and their sum which equals zero. This will be the output of integrator 19, FIGS. 1 and 3. The zero at the output of integrator 19 even though there is a −2 output from integrator 18 results in a zero at the output of multiplier 20 and, hence, no output from correlator 1.

Figure 8:
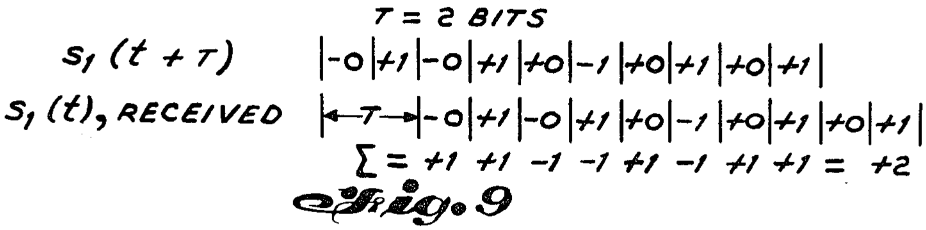
Figure 13:
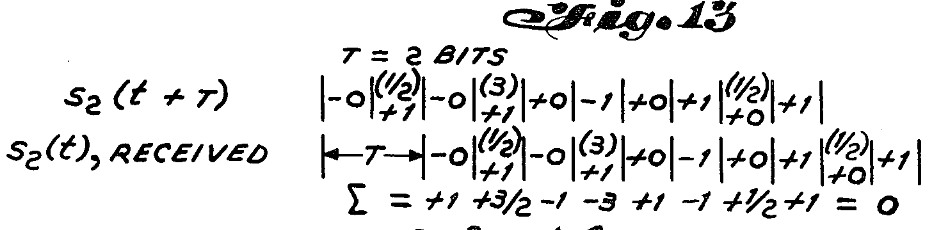

FIG. 8 shows the relationship between the first sequence of coded pulses of FIG. 5 and its replica when T equals 2 bits. FIG. 13 shows the same thing for the code of FIG. 10. FIG. 8 illustrates that there is a +2 output of integrator 18, FIGS. 1 and 3 and FIG. 13 illustrates that there is a zero output from integrator 19, FIGS. 1 and 3 due to the summation of the correlation products obtained in multipliers 16 and 17. Since there is zero output from integrator 19, multiplier 20 will also produce a zero output resulting in no output from correlator 1.

Figure 9:
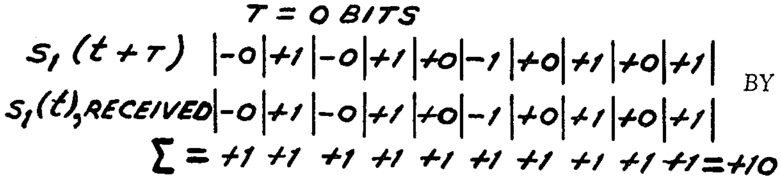
Figure 14:
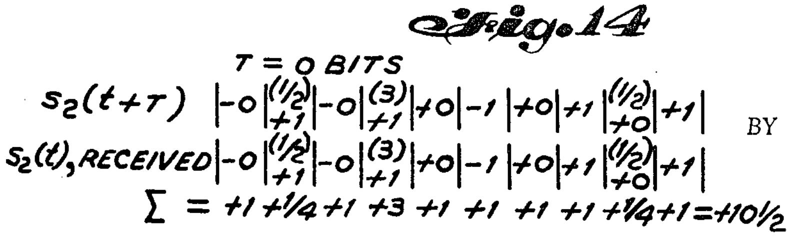

FIGS. 9 and 14 illustrate time coincidence between the code of FIG. 5 and its replica and time coincidence between the code of FIG. 10 and its replica. The output of integrator 18, FIGS. 1 and 3 is +10 units according to FIG. 9 and the output of integrator 19, FIGS. 1 and 3 is +10½ units according to FIG. 14 and, hence, multiplier 20 produces an impulse of 10×10½ units at the output of correlator 1.

The foregoing illustrates how the code of FIG. 10 cooperates with the code of FIG. 5 on a multiplex basis, either time or frequency multiplex, to assure an impulse correlation function at the output of correlator 1. It will be appreciated that at all values of T at least one of the sequences of coded pulses and its replicia produces a zero thus, there is no output from correlation means 1 except at T equals zero when both sequences of coded pulses and their replicas produce a finite output level. It is this cooperation of the multiplexed sequences of coded pulses that reduces the tedious and complex job of producing a long sequence of coded pulses which when correlated with a replica thereof produces a zero output at all times except at T equals zero.

Figure 15:
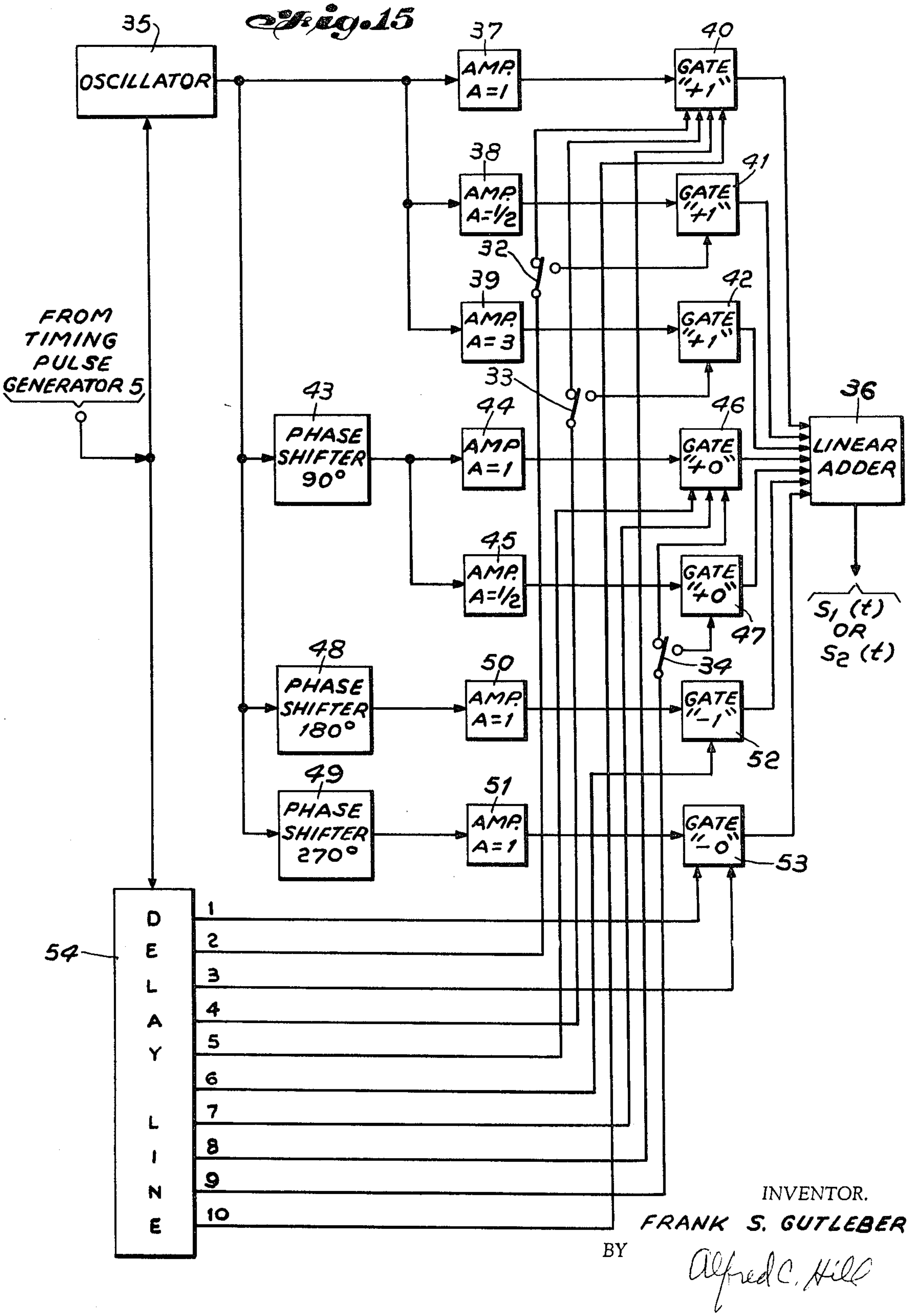
FIG. 15 is a block diagram of one form of coder which may be utilized to generate the sequence of coded pulses in the systems of FIGS. 1 and 3.

FIG. 15 illustrates one form of coders 7 and 10, FIGS. 1 and 3. With switches 32, 33, and 34 in the position illustrated, coder 7, FIGS. 1 and 3 is provided to generate the code of FIG. 5. When switches 32, 33 and 34 are moved to their other position there is provided coder 10, FIGS. 1 and 3 to generate the code of FIG. 10. It should be noted that switches 32, 33 and 34 switch in different amplitude of a selected phase of the output signal of oscillator 35 to produce the desired amplitude for the particular phase of signal coupled to linear adder 36. A pulse from generator 5 triggers oscillator 35 into operation and produces an oscillatory output having a reference phase of 0°. This phase of signal is applied to amplifiers 37, 38 and 39. It will be appreciated that ampliler 37 produces unity amplitude for the oscillatory output of oscillator 35 at a 0° phase shift while amplifiers 38 and 39 produce, respectively, half of unity and three times unity amplitude for the same 0° phase shift to produce the indicated outputs for bits two and four of the code illustrated in FIG. 10. The output of amplifiers 37, 38 and 39 are coupled to gates 40, 41 and 42, respectively.

The output from oscillator 35 is also coupled to a 90° phase shifter 43 which shifts the reference phase of the output of oscillator 35 by a 90° phase shift prior to coupling to amplifiers 44 and 45. It will be appreciated that the output of amplifier 44 is unity amplitude and is coupled to gate 46 while the output of amplifier 45 is one-half of unity amplitude required to generate the ninth bit of the code of FIG. 10, and is coupled to gate 47.

The output of oscillator 35 is also coupled to phase shifter 48 and 49 to provide a 180° phase shift and a 270° phase shift, respectively, of the output of oscillator 35. Since both codes of FIGS. 5 and 10 require only a unity magnitude for the −1 and −0 phase conditions of the code there is provided only one amplifier 50 producing unity amplitude coupled to shifter 48 and only one amplifier 51 producing unity amplitude coupled to phase shifter 49. The outputs of amplifiers 50 and 51 are coupled to gates 52 and 53, respectively.

At a time delayed from the start of oscillator 35, as provided by the delay line 54 prior to first time position tap, there is produced timing signals on the ten output taps of delay line 54 which will in sequence trigger or gate the proper gates 40, 46, 52 and 53 to produce the code of FIG. 5 with the switches 32, 33 and 34 in the position indicated. For instance, the output from the first tap of delay 54 is coupled to gate 53 to produce a −0 phase condition which is the condition for the first bit of the code of FIG. 5. The output from the second tap of delay line 54 is coupled to gate 40 to produce the +1 phase condition for the second bit of the code of FIG. 5. Continuing on down the output taps of delay line 54 and following their connections to the appropriate ones of gates 40, 46, 52 and 53 it can be readily ascertained how the code of FIG. 5 is generated without a further lengthy discussion.

To generate the code of FIG. 10 all that is necessary is to change the position of switches 32, 33, and 34 to their other position and thereby connect gates 41, 42 and 47 to the appropriate time position tap of delay 54 in place of gates 40 and 46 as illustrated. As before the connections to the delay line taps can be traced to the appropriate one of the gates 40, 41, 42, 46, 47, 52 and 53 to determine the manner of generating the code of FIG. 10 and remove the necessity of a lengthy discussion of how each bit of the code is generated.

FIGS. 16 and 17 illustrate two other codes that may be employed in the arrangements of FIGS. 1 and 3 to produce the desired impulse correlation function at the output of correlator 1. The bar graph of FIG. 16 illustrates the correlation products of the first sequence of coded pulses wherein the numerals in the circles indicate the particular value of T. FIG. 17 is a bar graph illustrating the second sequence of coded pulses wherein the numbers in the circle again represent the particular value of T. In both FIGS. 16 and 17, as was described in connection with FIGS. 5 and 10, it is possible to take a diagonal row having the same numeral in the circle and obtain the summation of the correlation products of the codes illustrated in FIGS. 16 and 17 for the various values of T.

The result of summing the diagonal rows of FIGS. 16 and 17 is illustrated in FIG. 18 and clearly demonstrates how at least one of the codes in FIGS. 16 and 17 is equal to zero at all values of T except $T=0$. Thus, in FIGS. 1 and 3, when multiplier 20 operates upon the output of integrators 18 and 19 at various values of T there results at the output of correlator 1 all zeros except at $T=0$ when an impulse of +20 is produced.

It will be recognized that the codes of FIGS. 16 and 17 are simple binary codes and may be generated as illustrated in FIG. 19. Oscillator 55 is triggered on by the output of timing pulse generator 5 and is coupled directly to amplifier 56 without any phase shift and is provided with an amplitude of unity for coupling to gate 57. The output of oscillator 55 is also coupled to phase shifter 58 which shifts the phase of the oscillatory output of oscillator 55 by 180°. This is applied to amplifier 59 and, hence, to gate 60 with unity amplitude. "1" has been designated as zero phase and is present at output of gate 57 while "0" has been designated as 180° phase and is present at the output of gate 60. Code bits from gates 57 and 60 are provided under control of the output of delay line 61. With switches 62 and 63 in the position illustrated there will be generated the code of FIG. 16 with an output from gate 60 at the first time interval, an output from gate 57 at the second time interval, an output from gate 60 at the third time interval, and an output from gate 60 at the fourth time interval.

When it is desired to generate the code of FIG. 17, switches 62 and 63 are moved to their other position so that at the first time interval there is an output from gate 60, at the second time interval there is an output from gate 57, at the third time interval there is an output from gate 57, at the fourth time interval there is an output from gate 60, and at the fifth time interval there is an output from gate 60. The output from gates 57 and 60 are coupled to linear adder 64 to produce the code selected from the codes illustrated in FIGS. 16 and 17.

While I have described above the principles of my invention in connection with specific apparatus, it is to be clearly understood that this description is made only by way of example and not as a limitation to the scope of my invention.

I claim:

1. An impulse correlation function generator comprising:
first means to produce at least first and second sequences of coded pulses, the pulses of said first sequence having a first predetermined code pattern and the pulses of said second sequence having a second predetermined code pattern different than said first predetermined pattern but having a given relationship thereto;
second means to provide replicas of said first and second sequences;
a first correlation means coupled to said first and second means responsive to said first sequence and said replica of said first sequence to provide therefrom a first correlated output;
at least a second correlation means coupled to said first and second means responsive to said second sequence and said replica of said second sequence to provide therefrom a second correlated output;
said given relationship between said first and second predetermined patterns causing both of said first and second correlated outputs to have a finite value when each of said first and second sequences and their replicas are time coincident and causing at least one of said first and second correlated outputs to have a zero value for all other time delay intervals between each of said first and second sequences and their replicas; and
a third correlation means coupled to said first and second correlation means for correlating said first and second correlated outputs to produce an impulse output at said coincident time and a zero output at said all other time delay intervals.

2. A generator according to claim 1, wherein
said first means includes
third means to time multiplex said first and second sequences; and
said second means provides time multiplexed replicas of said first and second sequences.

3. A generator according to claim 1, further including
a delay means coupled to an input of said first and second correlation means and the outputs of said first means to vary the time of arrival of said first and second sequences at said input of said first and second correlation means.

4. A generator according to claim 1, wherein
said first correlation means, said second correlation means and said third correlation means each include
a multiplier, and
an integrator coupled in series with said multiplier.

5. A generator according to claim 1, wherein
said first means includes third means to frequency multiplex said first and second sequences; and said second means provides frequency multiplexed replicas of said first and second sequences.

6. A generator according to claim 5, wherein said second means includes filter means to separate said replicas of said first and second sequences from each other and to couple said separated replicas of said first and second sequences to the appropriate one of said first and second correlation means.

7. A generator according to claim 2, wherein said first means includes a first coder to generate said first sequence having said first predetermined pattern, a second coder to generate said second sequence having said second predetermined pattern, a source of carrier signal, a first modulator coupled to said first coder and said source, and a second modulator coupled to said second coder and said source; and said third means includes a timing pulse generator, an inhibit gate having its normal input coupled to said generator and its output coupled to said first coder, and a first delay means having its input coupled to said generator and its output coupled to said generator and its output coupled to said second coder and the inhibit input of said inhibit gate.

8. A generator according to claim 7, further including a second delay means coupled to an input of said first and second correlation means and the outputs of said first and second modulators to vary the time of arrival of said first and second sequences at said input of said first and second correlation means.

9. A generator according to claim 5, wherein said first means includes a first coder to generate said first sequence having said first predetermined pattern, a second coder to generate said second sequence having said second predetermined pattern, a first modulator coupled to said first coder, and a second modulator coupled to said second coder; and said third means includes a timing pulse generator coupled to said first and second coders, a first source of carrier signal having a first frequency coupled to said first modulator, and a second source of carrier signal having a second frequency different than said first frequency coupled to said second modulator.

10. A generator according to claim 9, further including a delay means coupled to an input of said first and second correlation means and the outputs of said first and second modulators to vary the time of arrival of said first and second sequences at said input of said first and second correlation means.

References Cited

UNITED STATES PATENTS

| | | | |
|---|---|---|---|
| 2,935,604 | 5/1960 | Di Toro | 325—42 X |
| 3,103,009 | 9/1963 | Baker | 235—181 X |
| 3,208,065 | 9/1965 | Gutleber et al. | 235—181 X |

MALCOLM A. MORRISON, Primary Examiner

F. D. GRUBER, Assistant Examiner

U.S. Cl. X.R.

235—183, 184, 150.5; 325—42; 343—100